United States Patent [19]
Kwon

[11] Patent Number: 5,977,728
[45] Date of Patent: Nov. 2, 1999

[54] CIRCUIT FOR CONTROLLING A HORIZONTAL FOCUS SIGNAL IN A MONITOR

[75] Inventor: Hee-Joong Kwon, Seoul, Rep. of Korea

[73] Assignee: Daewoo Electronics Co., Ltd., Seoul, Rep. of Korea

[21] Appl. No.: 08/987,475

[22] Filed: Dec. 9, 1997

[30] Foreign Application Priority Data

Dec. 28, 1996 [KR] Rep. of Korea ........................ 96-75557

[51] Int. Cl.$^6$ ...................................... H01J 29/58
[52] U.S. Cl. ............... 315/382; 315/368.21; 315/368.22; 315/382.1
[58] Field of Search ........................ 315/368.18, 368.21, 315/368.22, 382, 382.1, 370, 411; 348/806

[56] References Cited

U.S. PATENT DOCUMENTS

| | | | |
|---|---|---|---|
| 5,245,254 | 9/1993 | Lee | 315/382 |
| 5,442,263 | 8/1995 | Alig | 315/382.1 |
| 5,615,092 | 3/1997 | Helfrich | 363/21 |
| 5,705,900 | 1/1998 | Hwang | 315/382 |

FOREIGN PATENT DOCUMENTS

| | | |
|---|---|---|
| 1-147968 | 6/1989 | Japan . |
| 7-154633 | 6/1995 | Japan . |
| 97-17120 | 4/1997 | Rep. of Korea . |

OTHER PUBLICATIONS

JAPIO Abstract Accession No. 02850368 & JP 010147968 A (Mitsubishi) Jun. 9, 1989.

*Primary Examiner*—Edward P. Westin
*Assistant Examiner*—Nikita Wells
*Attorney, Agent, or Firm*—Jacobson, Price, Holman & Stern PLLC

[57] ABSTRACT

A circuit for controlling a horizontal focus signal improves picture quality, which has horizontal and vertical focus signal generating sections for generating parabola-shaped horizontal and vertical focus signals according to horizontal and vertical deflection signals, a high voltage generating section for receiving the dynamic focus signal, a DC power supply controlling section for detecting voltage supplied from an auxiliary coil of said high voltage generating means, and for generating a PWM signal to generate a DC power supply corresponding to a mode according to a voltage detected by an auxiliary coil of the high voltage generating section, a DC voltage varying section for generating a DC voltage corresponding to the mode according to the PWM signal, and a horizontal focus signal amplifying section for amplifying the horizontal focus signal according to the DC voltage of the DC voltage varying section to supply the amplified horizontal focus signal to a mixing section. The horizontal focus signals are amplified according to the DC voltage varied by the frequency of the horizontal sync signal for finely controlling the horizontal focus signal when finely varying the horizontal sync signal, to thus improve the resolution of a monitor.

3 Claims, 5 Drawing Sheets

CIRCUIT FOR CONTROLLING A HORIZONTAL FOCUS SIGNAL IN A MONITOR

BACKGROUND OF THE INVENTION

1. Field of the Invention

The present invention relates to a cathode ray tube of a monitor, and more particularly to a circuit for controlling a horizontal focus signal in a monitor wherein an amplification factor of a horizontal focus signal is controlled in accordance with a DC power supply that is varied by a varied horizontal frequency for improving picture quality.

2. Description of the Prior Art

A cathode ray tube of a general monitor focuses and accelerates thermoelectrons emitted from an electron gun, and leads the focused and accelerated thermoelectrons to collide onto a phosphor layer via apertures perforating through a shadow mask to form pixels. At this time, the thermoelectrons emitted from the electron gun are deflected in the horizontal and vertical direction associative with a current of sawtooth waveform that flows through vertical and horizontal deflection coils.

However, since the phosphor layer of a general monitor has a dished plane, resolution is degraded at the periphery of a picture when the electron beam is deflected by centering about the center of the monitor. In order to improve the resolution at the periphery of the picture, a parabola-shaped focus signal is required for permitting the electron beam to accurately scan the phosphor layer. At this time, the parabola-shaped focus signal is classified into a static focus signal of which peak value is fixed and a dynamic focus signal of which peak value is varied in accordance with a frequency of a horizontal sync signal.

Figure 1:
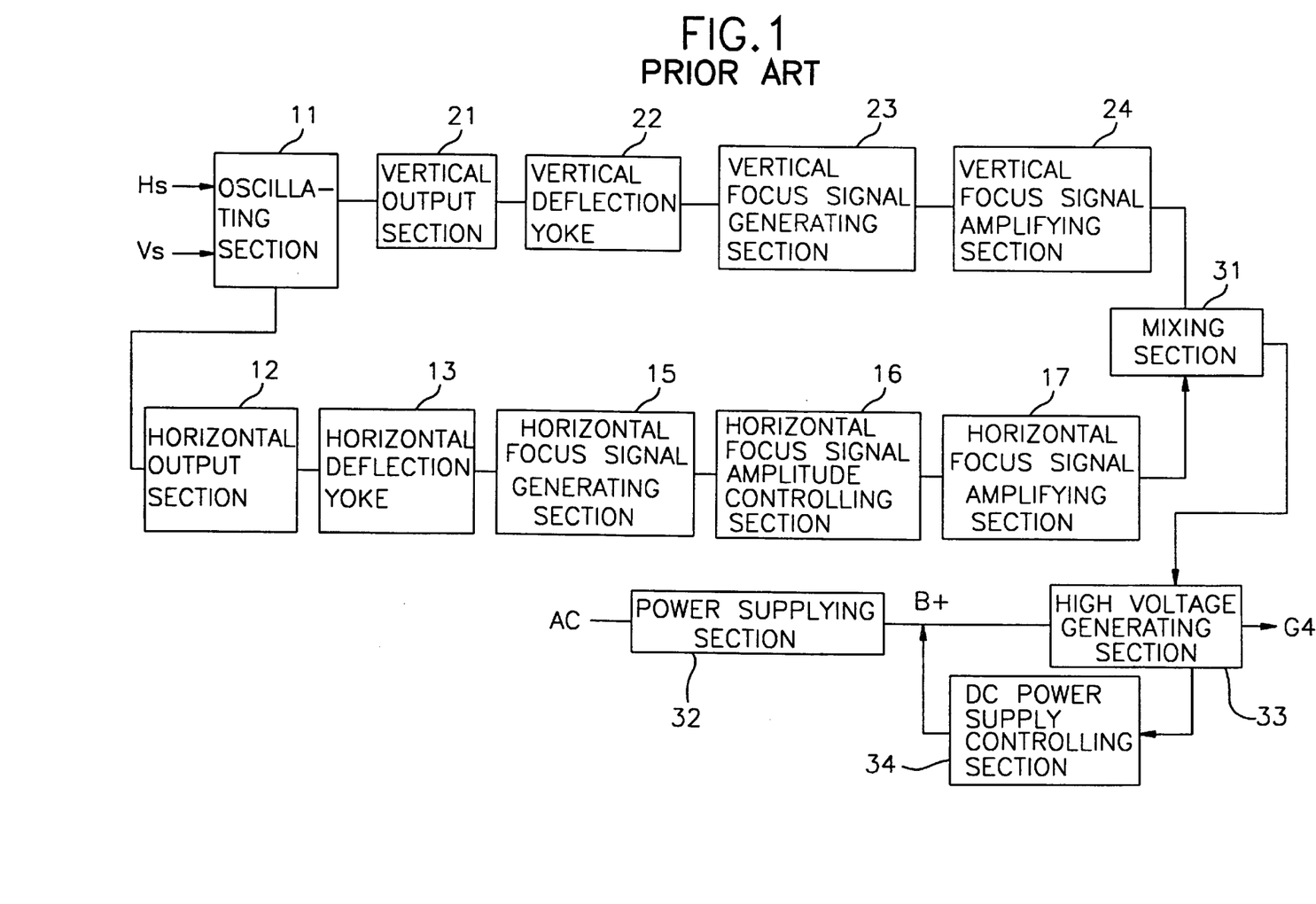
FIG. 1 is a view showing a construction of a conventional circuit for generating a dynamic focus signal.

A circuit for generating a dynamic focus signal in a general monitor is illustrated in FIG. 1. Referring to FIG. 1, a reference numeral 11 denotes an oscillating section which is oscillated in accordance with frequencies of externally-supplied horizontal sync signal Hs and vertical sync signal Vs to generate a horizontal deflection signal and a vertical deflection signal; 12, a horizontal output section for controlling the output of the horizontal deflection signal in accordance with a scanning interval and flyback interval; and 13, a horizontal deflection yoke for supplying the horizontal deflection signal from horizontal output section 12 to deflect the electron beam in a horizontal direction.

A reference numeral 15 denotes a horizontal focus signal generating section for producing a parabola-shaped focus signal from an output signal of horizontal deflection yoke 13; 16, a horizontal focus signal-amplitude controlling section which is switched in accordance with the horizontal focus signal to regulate an amplitude of the horizontal focus signal; and 17, a horizontal focus signal amplifying section for amplifying an output of horizontal focus signal-amplitude controlling section 16.

A reference numeral 21 denotes a vertical output section for controlling an output of the vertical deflection signal in accordance with the scanning interval and flyback interval; and 22, a vertical deflection yoke for supplying the vertical deflection signal from vertical output section 21 to deflect the electron beam in the vertical direction.

A reference numeral 23 denotes a vertical focus signal generating section for generating a parabola-shaped vertical focus signal from an output signal of vertical deflection yoke 22; and 24, a vertical focus signal amplifying section for amplifying the vertical focus signal of vertical focus signal generating section 23.

A reference numeral 31 denotes a mixing section for mixing the horizontal focus signal with vertical focus signal to provide a dynamic focus signal; and 32, a power supplying section for shaping an externally-supplied AC power supply AC to provide a DC power supply B+, and overlapping DC power supply B+ with the dynamic focus signal. Also, a reference numeral 33 denotes a high voltage generating section for providing a high voltage in accordance with an overlap signal, and supplying the generated high voltage to a grid terminal G4 of the cathode ray tube.

A reference numeral 34 denotes a DC power supply controlling section for generating a pulsewidth modulation (PWM) signal corresponding to DC power supply B+ detected by an auxiliary coil Lf of high voltage generating section 33, generating a voltage in accordance with the PWM signal and supplying the generated voltage to high voltage generating section 33 as DC power supply B+.

Figure 2:
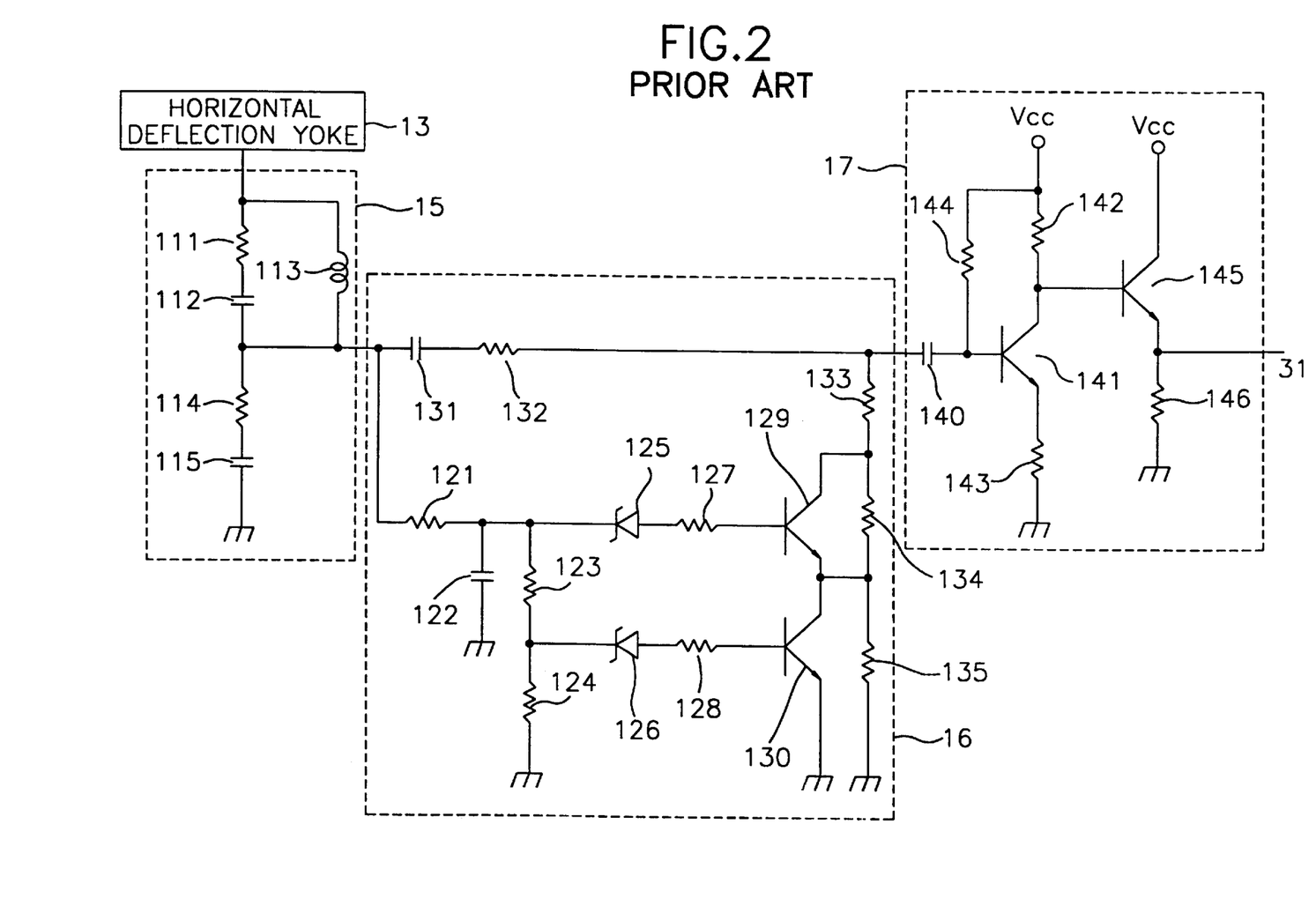
FIG. 2 is a detailed view showing a construction of the horizontal focus signal generating section, horizontal focus signal-amplitude controlling section and horizontal focus signal amplifying section shown in FIG. 1.

Here, horizontal focus signal generating section 15, horizontal focus signal-amplitude controlling section 16 and horizontal focus signal amplifying section 17 are as shown in FIG. 2. In FIG. 2, horizontal focus signal generating section 15 is formed by a resistor 111 and a capacitor 112 serially connected to each other for integrating the output signal of horizontal deflection yoke 13, an inductor 113 for storing a discharge energy of resistor 111 and capacitor 112, and a resistor 114 and a capacitor 115 serially connected to each other for shaping an output signal of capacitor 112.

Horizontal focus signal-amplitude controlling section 16 includes a resistor 121 and a capacitor 122 serially connected to each other for shaping the horizontal focus signal of horizontal focus signal generating section 15. Also included as parts are resistors 123 and 124 serially connected to each other for diving an output signal of capacitor 122, and a Zenor diode 125 connected to an output side of capacitor 122 for switching in the on state when the output signal of capacitor 122 is a voltage of exceeding a preset value. Also, a zener diode 126 is connected to the output side of resistor 123 for switching in the on state when an output signal of resistor 123 exceeds a preset value. Resistors 127 and 128 respectively bias output voltages of zener diodes 125 and 126, and transistors 129 and 130 are respectively switched in accordance with output voltages of resistors 127 and 128. A capacitor 131 and a resistor 132 are serially connected to each other for shaping an output signal of resistor 114. Further to these, resistors 133, 134 and 135 respectively connected between the output side of resistor 132, a collector side and an emitter sides of transistors 129 and 130 control output current of capacitor 131 and resistor 132 in accordance with the switching state of transistors 129 and 130 to regulate the amplitude of an output signal of resistor 132.

Horizontal focus signal amplifying section 17 has a capacitor 140 for eliminating a DC component of the horizontal focus signal of which amplitude is controlled by resistors 132, 133, 134 and 135, and a transistor 141 for amplifying an output signal of capacitor 140. Also, a plurality of resistors 142, 143 and 144 are respectively connected to a collector side of the transistor 141, between an emitter side and a ground of the transistor 141, and between the collector side and the base side of the transistor 141. for determining an amplification factor of an output signal of capacitor 140. A transistor 145 for buffering the output signal of transistor 141, and a resistor 146 connected to an emitter side of transistor 145 for determining the output current of transistor 145 are provided.

On the other hand, vertical output section 21, vertical deflection yoke 22, vertical focus signal generating section 23 and vertical focus signal amplifying section 24 are operated identically to horizontal output section 12, horizontal deflection yoke 13, horizontal focus signal generating section 15 and horizontal focus signal amplifying section 17. Thus, a detailed description of the operation will be deleted.

Figure 3:
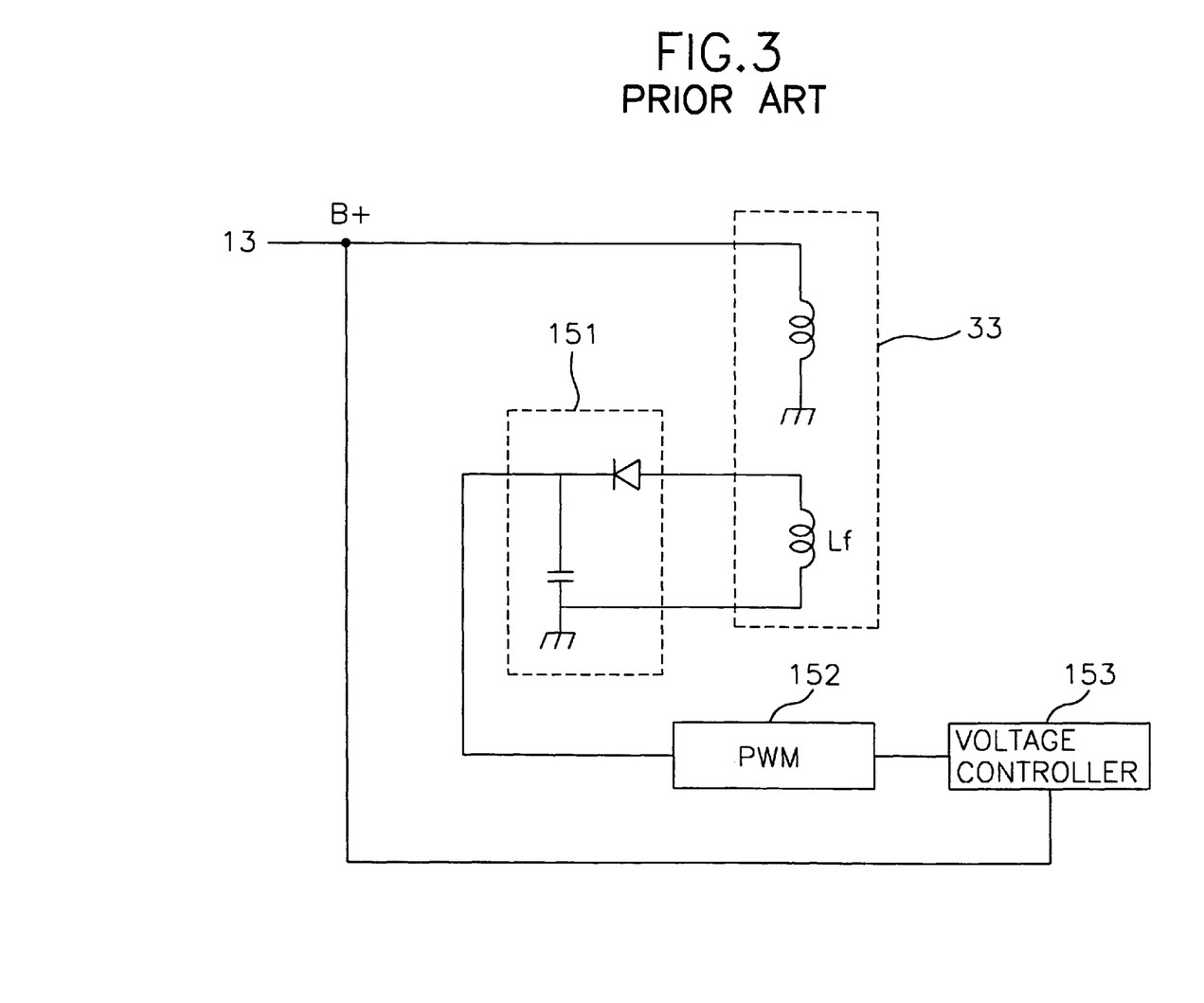
FIG. 3 is a detailed view showing a construction of the DC power supply controlling section of FIG. 1.

DC power supply controlling section 34 includes a voltage detector 151 having a diode and a capacitor for rectifying and shaping an output signal of auxiliary coil Lf of high voltage generating section 33 which detects DC power supply B+ to detect an output voltage of high voltage generating section 33. In addition to voltage detector 151, a pulsewidth modulator (PWM) 152 generates a PWM signal for producing DC power supply B+ in accordance with an output voltage of voltage detector 151, and a voltage controller 153 produces DC power supply B+ in accordance with the PWM signal to supply it to high voltage generating section 33.

Here, PWM 152 is provided to produce the PWM signal for heightening DC power supply B+ from power supplying section 32 when the horizontal frequency is raised to thus lower the output voltage of voltage detector 151.

In the general circuit for generating the dynamic focus signal formed as above, horizontal sync signal Hs and vertical sync signal Vs are externally supplied to oscillating section 11. Then, oscillating section 11 is oscillated in accordance with the frequencies of horizontal sync signal Hs and vertical sync signal Vs to generate the horizontal deflection signal and vertical deflection signal. The generated horizontal deflection signal and vertical deflection signal are respectively supplied to horizontal output section 12 and vertical output section 21.

Horizontal output section 12 controls the output of horizontal deflection signal in accordance with the scanning interval and flyback interval, and the horizontal deflection signal of horizontal output section 12 is supplied to horizontal deflection yoke 13. Then, horizontal deflection yoke 13 deflects the electron beam in the horizontal direction.

The output signal of horizontal deflection yoke 13 is supplied to horizontal focus signal generating section 15 which in turn generates the parabola-shaped horizontal focus signal. The horizontal focus signal is supplied to horizontal focus signal-amplitude controlling section 16.

Horizontal focus signal-amplitude controlling section 16 reduces the amplitude of the horizontal focus signal when the amplitude of the horizontal focus signal exceeds the preset value. The output signal of horizontal focus signal-amplitude controlling section 16 is supplied to horizontal focus signal amplifying section 17.

Thereafter, horizontal focus signal amplifying section 17 amplifies the horizontal focus signal to supply the amplified signal to mixing section 31.

Meanwhile, vertical output section 21 controls the output of the supplied vertical deflection signal in accordance with the scanning interval and flyback interval, and the output signal of vertical output section 21 is supplied to vertical deflection yoke 22 which then deflects the electron beam in the vertical direction.

The output signal of vertical deflection yoke 22 is supplied to vertical focus signal generating section 23. Then, vertical focus signal generating section 23 produces the parabola-shaped vertical focus signal in accordance with the vertical deflection signal of sawtooth waveform from vertical deflection yoke 22. The vertical focus signal is supplied to vertical focus signal amplifying section 24 which then amplifies the vertical focus signal in accordance with the preset value.

The amplified horizontal focus signal and vertical focus signal are supplied to mixing section 31. Then, mixing section 31 mixes the amplified horizontal focus signal and vertical focus signal to produce the dynamic focus signal which is in turn supplied to high voltage generating section 33.

On the other hand, externally-supplied AC power supply AC is provided to power supplying section 32 which shapes AC power supply AC to provide DC power supply B+. Thus, DC power supply B+ overlaps with the dynamic focus signal, and the overlap signal is supplied to high voltage generating section 33. In accordance with the overlap signal, high voltage generating section 33 provides the high voltage, and the generated high voltage is supplied to grid terminal G4 of the cathode ray tube.

DC power supply B+ detected by auxiliary coil Lf of high voltage generating section 33 is supplied to DC power supply controlling section 34. Successively, DC power supply controlling section 34 detects the output voltage of high voltage generating section 33 operated in accordance with DC power supply B+ supplied, generates the PWM signal for generating DC power supply B+ corresponding to a mode in accordance with the detected DC voltage, and produces the DC power supply corresponding to the mode in accordance with the generated PWM signal to supply it to high voltage generating section 33.

The process of generating the parabola-shaped focus signal will be described with reference to FIG. 2.

The output signal of horizontal deflection yoke 13 is supplied to resistor 111 and capacitor 112 of horizontal focus signal generating section 15. Resistor 111 and capacitor 112 integrate the output signal of horizontal deflection yoke 13, and the output signal of resistor 111 and capacitor 112 is supplied to inductor 113. In turn, inductor 113 stores the energy discharged from resistor 111 and capacitor 112.

The output signal of resistor 111 and capacitor 112 is supplied to resistor 114 and capacitor 115, and resistor 114 and capacitor 115 shape the output signal of resistor 111 and capacitor 112.

The shaping signal of resistor 114 and capacitor 115 is sequentially supplied to resistor 121 and capacitor 122 of horizontal focus signal generating section 16. Resistor 121 and capacitor 122 shape the horizontal focus signal. Then, the resultant shaping signal is supplied to resistors 123 and 124 to be divided, and the resultant shaping signal and the divided signal are respectively supplied to zener diodes 125 and 126.

Zener diodes 125 and 126 are switched in a manner that zener diode 126 is switched in the turn-on state when the divided signal is more than a preset value, e.g., approximately 16 volts, of zener diode 125; whereas, zener diode 125 is switched in the turn-on state when the divided signal is more than a preset value, e.g., approximately 27 volts, of zener diode 126.

The output voltages of zener diodes 125 and 126 are respectively supplied to transistors 129 and 130 via resistors 127 and 128. Transistors 129 and 130 are switched in accordance with the switching state of zener diodes 125 and 126.

In other words, when the divided signal is more than the preset value of zener diode 125, transistors 129 and 130 are switched in the turn-on state. If the divided signal is more than the preset value of zener diode 126, transistor 130 is switched in the turn-on state.

Meanwhile, the horizontal focus signal of horizontal focus signal generating section 15 is sequentially supplied to capacitor 131 and resistor 132, and capacitor 131 and resistor 132 shape the horizontal focus signal.

Then, the amplitude of the shaped horizontal focus signal and the divided signal are varied in accordance with the switching state of transistors 129 and 130.

That is, when the amplitude of the shaped horizontal focus signal is smaller than the preset values of zener diodes 125 and 126, transistors 129 and 130 are switched in the turn-off state. The horizontal focus signal shaped in accordance with the turn-off state of transistors 129 and 130 is supplied to resistors 132, 133, 134 and 135, and the amplitude of the shaped horizontal focus signal is controlled in accordance with the divided values of resistors 132, 133, 134 and 135.

However, if the amplitude of the shaped horizontal focus signal exceeds the preset value of zener diode 126 to switch transistor 130 in the turn-on state, the shaped horizontal focus signal is supplied to resistors 132, 133 and 134. Then, resistors 132, 133 and 134 divide the shaped horizontal focus signal. In accordance with the divided resistance values, the amplitude of the shaped horizontal focus signal is controlled.

On the other hand, if the amplitude of the shaped horizontal focus signal is more than the preset value of zener diode 125 to switch transistors 129 and 130 in the turn-on state, the shaped horizontal focus signal is supplied to resistors 132 and 133. After this, resistors 132 and 133 divide the shaped horizontal focus signal. Also, in accordance with the divided resistance values, the amplitude of the shaped horizontal focus signal is controlled.

The horizontal focus signal of which amplitude is controlled as described above is supplied to horizontal focus signal amplifying section 17.

The horizontal focus signal with its amplitude controlled is supplied to capacitor 140 of horizontal focus signal amplifying section 17. Capacitor 140 eliminates the DC component of the output signal of horizontal focus signal-amplitude controlling section 16. Then, the output signal of capacitor 140 is supplied to transistor 141 which amplifies the output signal of capacitor 140. At this time, the amplification factor of transistor 141 is determined in accordance with the resistance values of plurality of resistors 142, 143 and 144.

The output signal of transistor 141 is supplied to transistor 145 which buffers the output signal of transistor 141. At this time, the output current of transistor 141 is determined by the resistance value of resistor 146.

Here, vertical output section 21, vertical deflection yoke 22, vertical focus signal generating section 23 and vertical focus signal amplifying section 24 are operated identically to horizontal output section 12, horizontal deflection yoke 13, horizontal focus signal generating section 15 and horizontal focus signal amplifying section 17. Thus, a detailed description of them will be deleted.

Additionally, a process of regulating DC power supply B+ detected by auxiliary coil Lf of high voltage generating section 33 will be described in more detail with reference to FIG. 3.

The output voltage of auxiliary coil Lf of high voltage generating section 33 is sequentially supplied to the diode and capacitor of voltage detector 131, and the diode and capacitor rectify and shape the output signal of auxiliary coil Lf to provide the DC voltage.

The DC voltage of voltage detector 151 is supplied to PWM 152. Thereafter, PWM 152 produces the PWM signal for generating the DC power supply corresponding to the mode in accordance with the output voltage of voltage detector 151, and the PWM signal is supplied to voltage controller 153. Then, voltage controller 153 generates DC power supply B+ corresponding to the mode in accordance with the PWM signal and supplies the generated DC power supply to high voltage generating section 33.

In the conventional dynamic focus signal generating circuit as described above, the amplification of the horizontal focus signal is varied in accordance with the amplitude of the horizontal focus signal. For this reason, the the horizontal and vertical focus signals are difficult to be finely amplified when the frequency of the horizontal sync signal is minutely varied, which results in degrading the resolution of the monitor.

SUMMARY OF THE INVENTION

Therefore, it is an object of the present invention to provide a circuit for controlling a horizontal focus signal in a monitor capable of finely amplifying horizontal and vertical focus signals by determining an amplification factor of the horizontal focus signal in accordance with a DC power supply that is varied by a frequency of a horizontal sync signal.

To achieve the above object of the present invention, there is provided a circuit for generating a dynamic focus signal including horizontal and vertical focus signal generating sections for respectively generating parabola-shaped horizontal and vertical focus signals in accordance with respective horizontal and vertical deflection signals provided from horizontal and vertical deflection yokes. Also, a high voltage generating section generates a high voltage in accordance with the dynamic focus signal and a DC power supply, and supplying the generated high voltage to a grid terminal of a cathode ray tube. A DC power supply controlling section generates a PWM signal to generate a DC power supply corresponding to a mode in accordance with a voltage detected by an auxiliary coil of the high voltage generating section, and generates the DC power supply corresponding to the mode in accordance with the generated PWM signal to supply it to the high voltage generating section. In addition to these parts, a DC voltage varying section for generating a DC voltage corresponding to the mode in accordance with the PWM signal, and a horizontal focus signal amplifying section for amplifying the horizontal focus signal in accordance with the DC voltage of the DC voltage varying section to supply the amplified horizontal focus signal to mixing section are provided.

In the circuit for controlling a horizontal focus signal in a monitor according to the present invention, the horizontal and vertical deflection signals from the horizontal and vertical deflection yokes are respectively supplied to the vertical and horizontal focus signal generating sections. Then, the vertical and horizontal focus signal generating sections respectively produce the parabola-shaped horizontal and vertical focus signal in accordance with the horizontal and vertical deflection signals. Also, the PWM signal generated from the auxiliary coil of the high voltage generating section is supplied to the DC voltage varying section which in turn generates the DC voltage corresponding to the PWM signal. The DC voltage is supplied to the horizontal focus signal amplifying section. Then, the vertical and horizontal focus signal amplifying sections amplify the vertical and horizontal focus signals in accordance with the DC voltage, and supply the amplified vertical and horizontal focus signals to the mixing section. That is, the horizontal and vertical focus signals are amplified in accordance with the DC voltage corresponding to the mode of the monitor. Thus, the horizontal and vertical focus signals are finely amplified when the frequency of the horizontal sync signal is minutely varied, thereby being capable of improving the resolution.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

Figure 4:
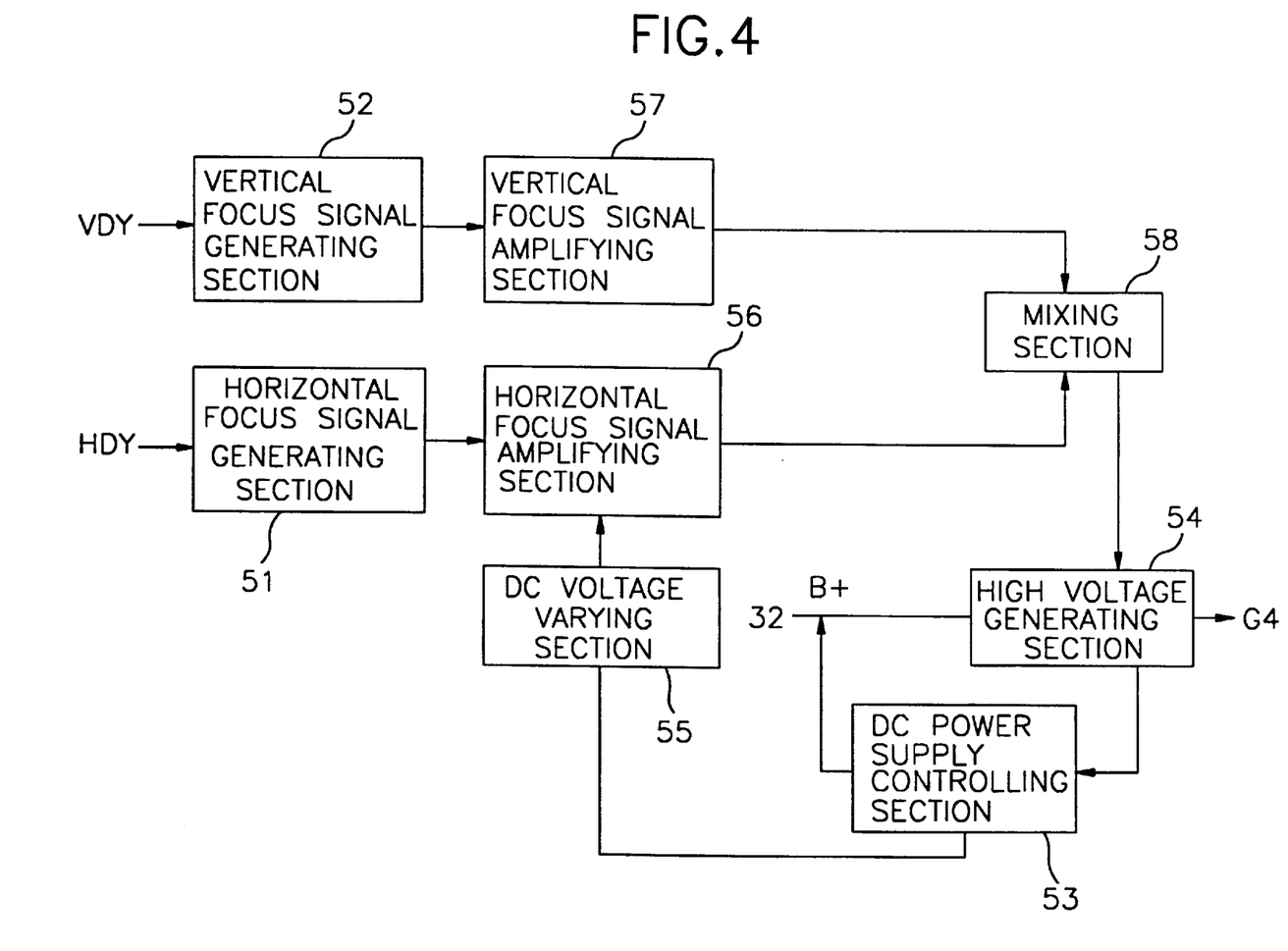
FIG. 4 is a view showing a construction of a circuit for controlling a horizontal focus signal in a monitor according to the present invention.
Figure 5:
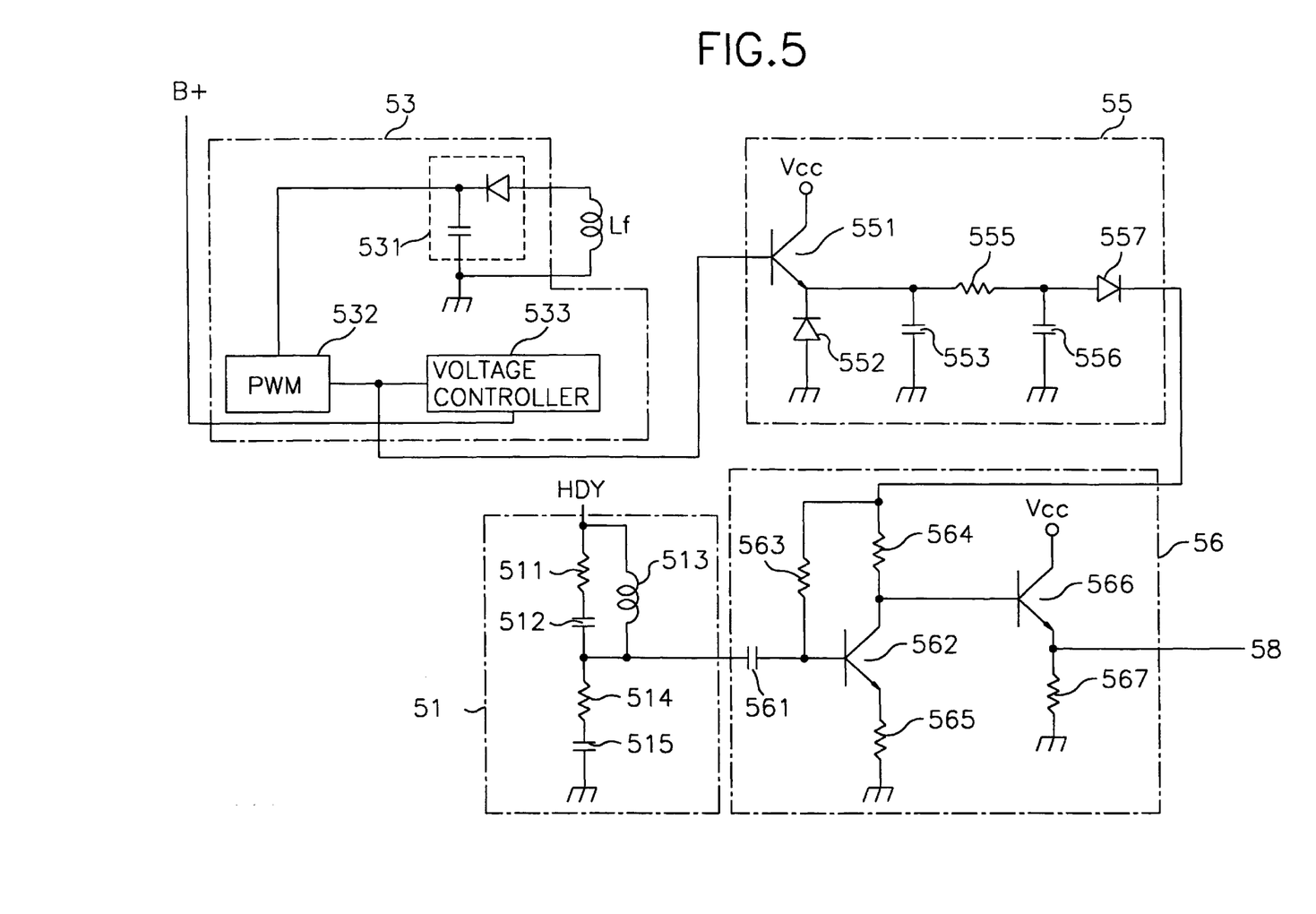
FIG. 5 is a detailed view showing a construction of the DC voltage varying section of FIG. 4.

FIGS. 4 and 5 show a construction of a circuit for generating a dynamic focus signal according to the present invention. Here, the detailed description of the parts performing the identical operation in the above-enumerated conventional monitor will be deleted.

In FIG. 4, a reference numeral 51 denotes a horizontal focus signal generating section for generating a parabola-shaped horizontal focus signal in accordance with a horizontal deflection signal from a horizontal deflection yoke HDY; and 52, a vertical focus signal generating section for generating a parabola-shaped vertical focus signal in accordance with a vertical deflection signal from a vertical deflection yoke VDY.

A reference numeral 53 denotes a DC power supply controlling section for detecting voltage supplied from an auxiliary coil (Lf) of high voltage generating section 54, for generating a PWM signal in accordance with a voltage detected from the auxiliary coil of high voltage generating section 54, and for a DC power supply corresponding to a mode in accordance with the generated PWM signal to supply it to a high voltage generating section 54.

A reference numeral 55 denotes a DC voltage varying section for generating a DC voltage corresponding to the mode of the monitor in accordance with the PWM signal of DC power supply controlling section 53; 56, a horizontal focus signal amplifying section for amplifying the horizontal focus signal in accordance with the DC voltage; and 57, a vertical focus signal amplifying section for amplifying the vertical focus signal.

Here, a voltage detector 531, a PWM 532 and a voltage controller 533 of DC power supply controlling section 53 are furnished to be identical to voltage detector 151, PWM 152 and voltage controller 153 described with reference to FIG. 3.

A resistor 511, a capacitor 512, an inductor 513, a resistor 514 and a capacitor 515 of horizontal focus signal generating section 51 are furnished identically to resistor 111, capacitor 112, inductor 113, resistor 114 and capacitor 115 described with reference to FIG. 2. Similarly, a capacitor 561, a transistor 562, resistors 563, 564 and 565, a transistor 566 and a resistor 567 of horizontal focus signal amplifying section 56 are furnished identically to capacitor 140, transistor 141, resistors 142, 143 and 144, transistor 145 and resistor 146 described with reference to FIG. 2.

However, DC voltage varying section 55, as shown in FIG. 5, includes a transistor 551 operated in the active state in accordance with the PWM signal of PWM 532, and a diode 552 for half-wave rectifying an output voltage of transistor 551. Additionally, a capacitor 553 charges and discharges an output voltage of diode 552 to provide the DC voltage, and a resistor 555 and a capacitor 556 are connected in parallel with each other for integrating an output signal of capacitor 553. Also, a diode 557 rectifies an output voltage of capacitor 556 to supply it to horizontal focus signal amplifying section 56.

Vertical focus signal generating section 52 and vertical focus signal amplifying section 57 are operated identically to horizontal focus signal generating section 51 and horizontal focus signal amplifying section 56, of which detailed description will thus be omitted.

An operation of the circuit for generating the dynamic focus signal according to the present invention constructed as above will be described in detail.

The horizontal deflection signal from horizontal deflection yoke HDY is supplied to horizontal focus signal generating section 51. Successively, horizontal focus signal generating section 51 produces the parabola-shaped horizontal focus signal in accordance with the horizontal deflection signal.

Here, the process of generating the horizontal focus signal is the same as of generating the horizontal focus signal in the foregoing conventional monitor, which will thus be deleted.

The output voltage of auxiliary coil Lf of high voltage generating section 54 is sequentially supplied to the diode and capacitor of voltage detector 531, and the diode and capacitor rectify and shape the output signal of auxiliary coil Lf to provide the voltage.

The output voltage is supplied to PWM 532, and PWM 532 provides the PWM signal for heightening DC power supply B+ when the horizontal frequency is high and the DC voltage is low. The PWM signal is supplied to voltage controller 533, and voltage controller 533 generates the DC power supply higher than DC power supply B+ in accordance with the PWM signal to supply the high DC power supply to high voltage generating section 54.

The detailed operating process of the DC power supply controlling section is the same as the DC power supply controlling section in the conventional monitor, of which detailed description will thus be omitted.

The PWM signal of PWM 532 is supplied to transistor 551 of DC voltage varying section 55, and transistor 551 is operated in the active state in accordance with the PWM signal. The output signal of transistor 551 is supplied to diode 552, and diode 552 charges the output signal of transistor 551. The charging voltage is provided as the DC voltage.

The DC voltage is supplied to capacitor 553 which then shapes the rectified output signal. The output signal of capacitor 553 is sequentially supplied to resistor 555 and capacitor 556. After this, resistor 555 and capacitor 556 integrates the output signal of capacitor 553, and the integrated signal is supplied to diode 557. Thus, diode 557 rectifies the integrated signal to supply it to horizontal focus signal amplifying section 56.

On the other hand, horizontal focus signal amplifying section 56 amplifies the horizontal focus signal generated from horizontal focus signal generating section 51 in accordance with the DC voltage of DC voltage varying section 55.

In more detail, the horizontal focus signal of horizontal focus signal generating section 51 is sequentially supplied to capacitor 561, transistor 562, and resistor 563. Thereafter, capacitor 561, transistor 562, and resistor 563 eliminate the DC component of the horizontal focus signal. The output signal of capacitor 561 and output signal of DC voltage varying section 55 are respectively supplied to the base side and collector side of transistor 562 which in turn amplifies the output signal of capacitor 561. At this time, the amplification factor of transistor 562 is determined by the resistance values of plurality of resistors 565, 564 and 567 and output voltage of DC voltage varying section 55.

The output signal of transistor 562 is supplied to transistor 566 which buffers the output signal of transistor 562. At this time, the output current of transistor 566 is determined by the resistance value of resistor 561.

The output signal of horizontal focus signal amplifying section 56 is supplied to mixing section 58.

The operating process of vertical focus signal generating section 52 and vertical focus signal amplifying section 57 is the same as horizontal focus signal generating section 51 and horizontal focus signal amplifying section 56, of which detailed description will thus be omitted.

When employing the circuit for generating the dynamic focus signal according to the present invention described as above, the horizontal and vertical focus signals are amplified in accordance with the DC voltage which is varied by the frequency of the horizontal sync signal. Therefore, the horizontal focus signal is finely controlled when the horizontal sync signal is minutely varied, thereby improving the resolution of the monitor.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A circuit for controlling a horizontal focus signal in a monitor comprising:

horizontal and vertical focus signal generating means for respectively generating parabola-shaped horizontal and vertical focus signals in accordance with respective horizontal and vertical deflection signals provided from horizontal and vertical deflection yokes;

high voltage generating means for generating high voltage in accordance with said dynamic focus signal and a DC power supply, and supplying said high voltage to a grid terminal of a cathode ray tube;

DC power supply controlling means for detecting the voltage supplied from an auxiliary coil of said high voltage generating means, and for generating a PWM signal to generate said DC power supply corresponding to a mode in accordance with the voltage detected by said auxiliary coil of said high voltage generating means, and for generating said DC power supply corresponding to said mode in accordance with the generated PWM signal to supply said DC power supply to said high voltage generating means;

DC voltage varying means for generating a DC voltage corresponding to said mode in accordance with said PWM signal; and Horizontal focus signal amplifying means for amplifying said horizontal focus signal in accordance with said DC voltage of said DC voltage varying means, and supplying the amplified horizontal focus signal to mixing means.

2. A circuit for controlling a horizontal focus signal as claimed in claim 1, wherein said DC voltage varying means comprises:

a first transistor operated in the active state in accordance with said PWM signal of said DC power supply controlling means;

a first diode for half-wave rectifying an output signal of said first transistor;

a first capacitor for charging an output signal of said first diode, and providing a charging voltage as said DC voltage;

a first resistor and a second capacitor connected in parallel with each other for shaping an output voltage of said first capacitor; and a second diode for rectifying an output voltage of said second capacitor to provide a rectified output voltage to said horizontal focus signal amplifying means.

3. A circuit for controlling a horizontal focus signal as claimed in claim 2, wherein said horizontal focus signal amplifying means comprises:

a third capacitor for eliminating a DC component of said horizontal focus signal generating means;

a second transistor for amplifying an output signal of said third capacitor in accordance with said output voltage of said DC voltage varying means;

a plurality of resistors respectively connected to said collector side of said second transistor, between an emitter side and a ground of said second transistor, and between a base side and a collector of said second transistor for determining an amplification factor of an output signal of said second transistor;

a third transistor for buffering said output signal of said second transistor, and supplying a buffered horizontal focus signal to said mixing means; and a second resistor connected to an emitter side of said third transistor for determining an output current of said third transistor.

* * * * *